US012604273B2

(12) United States Patent
Lee et al.

(10) Patent No.: US 12,604,273 B2
(45) Date of Patent: Apr. 14, 2026

(54) TRAFFIC PATTERN ADAPTIVE MODEM GEAR CONTROL FOR ELECTRONIC DEVICES

(71) Applicant: MEDIATEK Inc., Hsinchu City (TW)

(72) Inventors: Chung-Pi Lee, Hsinchu City (TW); Yuan Yuan, Beijing (CN); LunHan Chang, Hsinchu City (TW); Jun Hu, Beijing (CN); Jianwei Zhang, Beijing (CN); Wei-Jen Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 383 days.

(21) Appl. No.: 18/332,036

(22) Filed: Jun. 9, 2023

(65) Prior Publication Data

US 2024/0406873 A1 Dec. 5, 2024

(30) Foreign Application Priority Data

Jun. 5, 2023 (CN) .......................... 202310657594.2

(51) Int. Cl.
*H04W 52/02* (2009.01)
*H04W 24/08* (2009.01)

(52) U.S. Cl.
CPC ....... *H04W 52/0258* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2015/0334653 A1* | 11/2015 | Ang | ................. | H04W 28/0221 |
| | | | | 370/311 |
| 2018/0324890 A1* | 11/2018 | Ljung | .................... | H04W 4/70 |
| 2022/0046738 A1* | 2/2022 | Challa | .................. | H04W 24/10 |

* cited by examiner

*Primary Examiner* — Saad Khawar
(74) *Attorney, Agent, or Firm* — McClure, Qualey & Rodack, LLP

(57) ABSTRACT

Provided is a traffic pattern adaptive modem (modulator-demodulator) gear control method for an electronic device. The traffic pattern adaptive modem (modulator-demodulator) gear control method includes: when a first criteria is met, on-line collecting a period of input data; executing traffic prediction; whether a second criteria is met to apply the traffic prediction is determined; when the second criteria is met, based on the traffic prediction, a modem gear is adaptively adjusted; and when the second criteria is not met, an algorithm is trained or a period is waited for continuing monitoring whether the second criteria is still met.

8 Claims, 1 Drawing Sheet

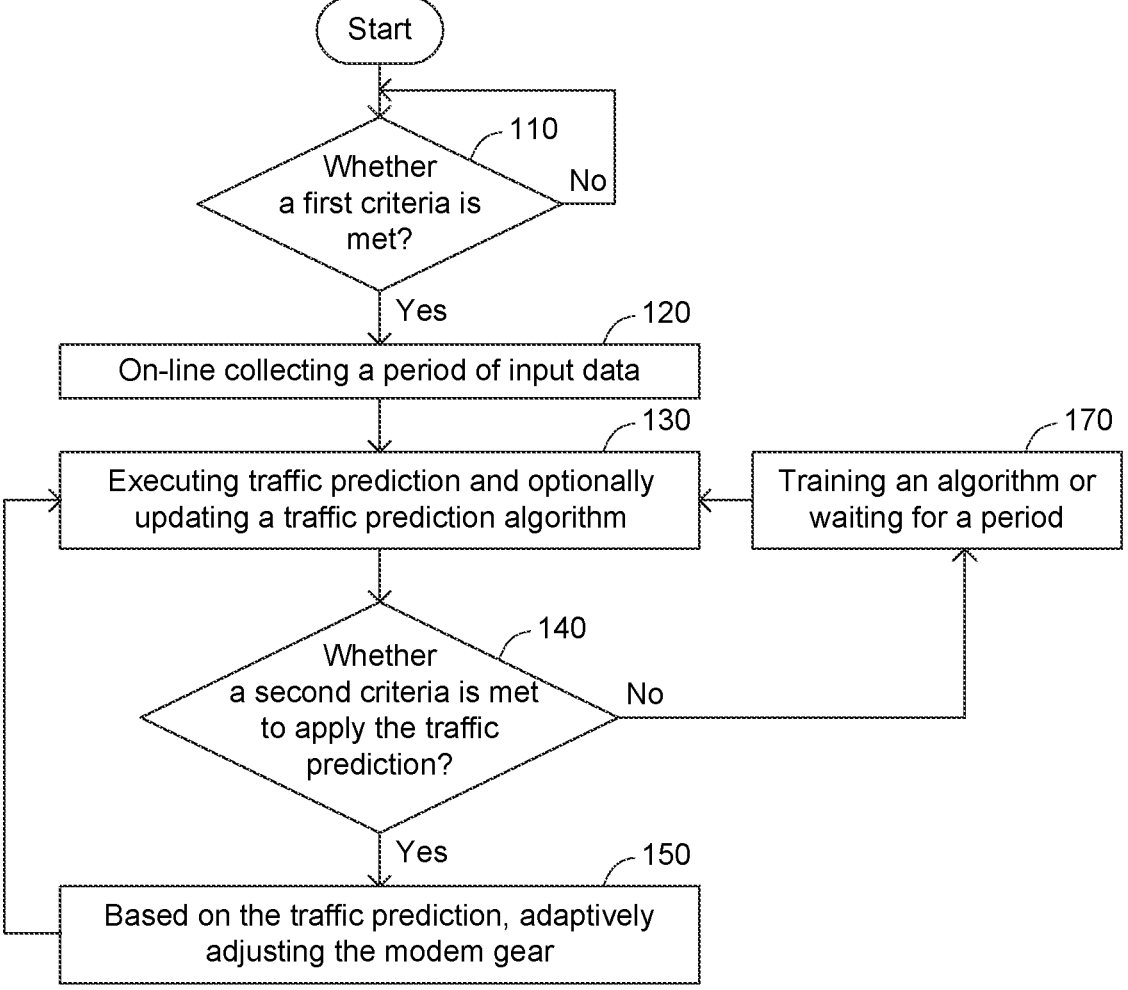

TRAFFIC PATTERN ADAPTIVE MODEM GEAR CONTROL FOR ELECTRONIC DEVICES

This application claims the benefit of People's Republic of China application Serial No. 202310657594.2, filed Jun. 5, 2023, the subject matter of which is incorporated herein by reference.

TECHNICAL FIELD

The disclosure relates in general to a traffic pattern adaptive modem (modulator-demodulator) gear control for electronic devices.

BACKGROUND

Millions of people utilize electronic devices every day. For example, smartphones are utilized for placing and receiving phone calls, for browsing the Internet, for playing games, for capturing images and video clips, for engaging in Instant Messaging (IM), and for other purposes. Besides smartphones, various types of electronic devices also have a modem built-in. For example, tablet devices, ECUs (Electronic Control Unit) for vehicles, smart home devices or personal computers. Those electronic devices may be utilized by users on a daily basis, to perform similar tasks. ECUs typically contain built-in modems for providing internet connectivity and location tracking via GPS devices. Smart home devices such as smart bulbs, smart plugs, and smart locks typically contain built-in modems for wireless communication, such as modems for receiving Wi-Fi and Bluetooth signals. Some high-end personal computers contain built-in modems for connecting to networks wirelessly.

Usually, electronic devices are powered by a rechargeable battery. Due to limited power storage of the rechargeable battery, how to reduce power consumption is an issue. In addition to extending battery life, setting the modem to power-saving mode has the following benefits: environmental protection, lower heat dissipation, longer device lifespan and quieter operation. Reducing energy consumption helps protect the environment. With reduced power consumption in power-saving mode, the amount of heat generated by the system is also reduced, which helps maintain a stable temperature for the device. The lower overall heat generation rate in power-saving mode means that electronic components in the device experience less wear and tear during operation, which can extend the device's lifespan. Power-saving mode may reduce the fan speed, resulting in reduced noise generated by the device, providing users with a quieter environment during use.

Smart mobile phones include a modem (modulator-demodulator) circuit. Power consumption issue is critical in modem gear control design.

Thus, it is important to have traffic-pattern-adaptive modem gear control for significantly improve the power consumption issue.

SUMMARY

According to one embodiment, provided is a traffic pattern adaptive modem (modulator-demodulator) gear control method for an electronic device. The traffic pattern adaptive modem (modulator-demodulator) gear control method includes: when a first criteria is met, on-line collecting a period of input data; executing traffic prediction; whether a second criteria is met to apply the traffic prediction is determined; when the second criteria is met, based on the traffic prediction, a modem gear is adaptively adjusted; and when the second criteria is not met, an algorithm is trained or a period is waited for continuing monitoring whether the second criteria is still met.

BRIEF DESCRIPTION OF THE DRAWINGS

FIG. 1 shows a traffic pattern adaptive modem gear control method for electronic devices according to one embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

One embodiment of the application discloses a traffic-pattern-adaptive modem (modulator-demodulator) gear control to significantly improve the power consumption issue. According to one embodiment of the application, based on the traffic pattern prediction result, the modem adapts traffic-pattern-adaptive gear control for better power consumption.

However, because the traffic patterns have real-time dynamic changes, it is highly challenging to make precise and real-time traffic pattern predictions. Therefore, one embodiment of the application discloses precise and real-time traffic pattern prediction implementations to solve this problem.

Moreover, in reducing power consumption, there are many dimensions of factors to be considered or tradeoff, for example but not limited by, complexity and/or latency and/or power.

In one embodiment of the application, targets are for example but not limited by, better power downgrade and less impact to the user experience (i.e. throughput (Tput) and/or latency).

Further, in one embodiment of the application, the applicable user scenarios include, for example but not limited by, 1) Texting, 2) video, 3) short video, 4) Calling, 5) streaming, 6) standby, and 7) gaming, etc.

Still further, in one embodiment of the application, the applicable network environments include, for example but not limited by, 1) CDRX (Connected Mode DRX (Discontinuous Reception)) enabled duration, 2) strong signal, 3) strong interference, 4) weak signal, etc.

Still further, in one embodiment of the application, the applicable resource allocations include, for example but not limited by, 1) pre-sync scheduling, 2) receiving (Rx) antennas number, 3) connection types FR2/FR1/ENDC/LTE, 4) bandwidth, 5) CC (carrier) number, 6) DVFS (Dynamic voltage and frequency scaling), 7) ARX (adaptive RX) etc.

"FR2" refers to frequency range 2, which is between 24250 MHz-52600 MHz. "FR1" refers to frequency range 1, which is between 410 MHz-7125 MHz. ENDC, or E-UTRAN New Radio-Dual Connectivity, is a Non-Standalone (NSA) feature that makes it possible for mobile devices to access both 5G and 4G LTE networks at the same time, which allows carriers to tap into the benefits of both network technologies simultaneously. Long-term evolution (LTE) is a standard for wireless broadband communication for mobile devices and data terminals, based on the GSM/EDGE and UMTS/HSPA standards.

FIG. 1 shows a traffic pattern adaptive modem gear control method for electronic devices according to one embodiment of the application. In one embodiment of the application, the traffic pattern adaptive modem gear control method is executed by, for example but not limited by, CPU or APP processors or the processors of modem of the electronic devices.

At step 110, whether a first criteria is met is determined. In on example, the first criteria includes for example but not limited by, any combination of: (1) a signal quality (for example but not limited by, signal noise ratio (SNR), movement status); (2) a category of application programs (APP) running in the electronic device; and (3) a network configuration state. Wherein the movement status refers to, for example but not limited by, whether the electronic device is static or moving, the movement speed of the electronic device and the like. In one embodiment of the application, when the APP running in the electronic device has regular traffic pattern, it is easy to predict the traffic pattern; and when the APP running in the electronic device has irregular traffic pattern, it is difficult to predict the traffic pattern. Thus, in one embodiment of the application, when the category of application programs (APP) running in the electronic device indicates that the APP running in the electronic device has regular traffic pattern, the first criteria is met; and when the category of application programs (APP) running in the electronic device indicates that the APP running in the electronic device has irregular traffic pattern, the first criteria is not met. For example, the network configuration state indicates whether RRC (Radio Resource Control) state is idle or active.

When the first criteria in the step 110 is met, the flow proceeds to the step 120. When the first criteria in the step 110 is not met, the flow repeats the step 110.

In step 120, a period of input data is on-line collected. The input data includes for example but not limited by, the RRC-configure parameters, a transport block (TB) size parameter, MCS (modulation coding scheme) parameters, packet inter-arrival-time parameters, a transmission type parameter, a transmission control protocol (TCP) window size, and any combination thereof. Wherein the transmission type parameter indicates whether the transmission is new transmission or re-transmission.

In step 130, traffic prediction is executed and optionally a traffic prediction algorithm is updated. In step 130, the traffic prediction is executed by a traffic prediction model (which may be an AI or a non-AI model). When the traffic prediction model is an AI model, for example but not limited by, the AI model may be a LSTM (Long Short-Term Memory) model. When the on-line collected input data is input into the traffic prediction model, the traffic prediction model generates an output prediction, which is for example but not limited by, 1) whether there is traffic during next transmission time; or 2) when there will be traffic. In one embodiment of the application, the traffic prediction algorithm is optionally on-line trained. For example when the traffic pattern is time-varying, then after traffic prediction, the traffic prediction algorithm is trained and updated. By so, the traffic prediction algorithm is evolved with time to adapt the time-varying traffic pattern.

In step 140, whether a second criteria is met to apply the traffic prediction is determined. For example but not limited by, the second criteria includes whether the prediction accuracy meets the accuracy threshold and/or whether power-saving gain meets the gain threshold. In one embodiment of the application, the accuracy threshold is for example but not limited by 90%. In another embodiment of the application, the accuracy threshold is that a normalized mean square error between the predicted traffic arrival time and the actual traffic arrival time is smaller than 0.1. In one embodiment of the application, the power saving gain threshold is for example but not limited by, the power saving gain threshold >5%.

When the second criteria in the step 140 is met, the flow proceeds to the step 150. When the second criteria in the step 140 is not met, the flow proceeds to the step 170.

In step 150, based on the traffic prediction, the modem gear is adaptively adjusted. In one example, for example but not limited by, the modem gear includes pre-sync scheduling, a receiving antennas (Rx) number, a connection type (FR2/FR1/ENDC/LTE) parameter, a bandwidth parameter, a DVFS (Dynamic voltage and frequency scaling) parameter, a ARX (adaptive RX) parameter or any combination thereof. Wherein the connection type parameter includes any combination of FR2, FR1, ENDC and LTE.

After the step 150, the flow returns to the step 130 for repeatedly executing traffic prediction and optionally updating the traffic prediction algorithm.

In step 170, an algorithm (for example, the LSTM model) is trained or a period is waited for continuing monitoring whether the second criteria is still met. In one embodiment of the application, the reason to wait for a period is that when the traffic pattern is irregular, then the traffic prediction is disabled until the traffic pattern is regular. In another embodiment of the application, another reason to wait for a period is that the algorithm is not well-trained and thus it has to wait until the algorithm is well-trained.

As described above, the traffic pattern adaptive modem gear control method in one embodiment of the application improves the modem gear control by traffic pattern prediction for better power consumption while satisfying the pre-defined metrics (latency and/or throughput and/or jitter) constraints.

Still further, the traffic pattern adaptive modem gear control method in one embodiment of the application is traffic-aware trigger timing. In details, the modem gear control in one embodiment of the application is dynamically triggered based on traffic pattern prediction. Also, the traffic pattern adaptive modem gear control method in one embodiment of the application is not limited to threshold-based trigger condition.

Still further, the traffic pattern adaptive modem gear control method in one embodiment of the application discloses traffic-aware modem gear control. In details, the resource (pre-sync scheduling, Rx number, DVFS, ARX (adaptive RX) or any combination thereof) is dynamically allocated based on traffic pattern prediction.

Still further, the traffic pattern adaptive modem gear control method in one embodiment of the application refers to traffic features at finer granularity both in time (e.g. order of milliseconds) and in the nature of traffic (physical layer and/or TCP layer) by referring to the input data (the input data including for example but not limited by, the RRC-configure parameters, transport block (TB) size, MCS (modulation coding scheme) parameters, packet inter-arrival-time, transmission type parameter, transmission control protocol (TCP) window size, and any combination thereof).

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A traffic pattern adaptive modem (modulator-demodulator) gear control method for an electronic device, the traffic pattern adaptive modem gear control method including:

when a first criteria is met, on-line collecting a period of input data;

executing traffic prediction based on the input data, wherein the input data includes Radio Resource Control (RRC) configure parameters, a transport block (TB) size parameter, modulation coding scheme (MCS) parameters, packet inter-arrival-time parameters, a transmission type parameter, a transmission control protocol (TCP) window size parameter, and any combination thereof;

determining whether a second criteria is met to apply the traffic prediction;

when the second criteria is met, based on the traffic prediction, adaptively adjusting a modem gear; and when the second criteria is not met, training an algorithm or waiting for a period while continuing to monitor the input data for meeting the second criteria.

2. The traffic pattern adaptive modem gear control method according to claim 1, wherein the first criteria includes any combination of a signal quality, a category of application programs (APP) running in the electronic device; and a network configuration state.

3. The traffic pattern adaptive modem gear control method according to claim 1, wherein the transmission type parameter indicates whether transmission is new transmission or re-transmission.

4. The traffic pattern adaptive modem gear control method according to claim 1, wherein the second criteria includes whether a prediction accuracy meets an accuracy threshold and/or whether a power-saving gain meets a gain threshold.

5. The traffic pattern adaptive modem gear control method according to claim 1, wherein the modem gear includes any combination of pre-sync scheduling, a receiving antennas (Rx) number, a connection type parameter, a bandwidth parameter, a Dynamic voltage and frequency scaling (DVFS) parameter, an adaptive RX (ARX) parameter.

6. The traffic pattern adaptive modem gear control method according to claim 5, wherein the connection type parameter includes any combination of FR2 (frequency range 2), FR1, ENDC (E-UTRAN New Radio-Dual Connectivity) and Long-term evolution (LTE).

7. The traffic pattern adaptive modem gear control method according to claim 1, further including: updating a traffic prediction algorithm.

8. The traffic pattern adaptive modem gear control method according to claim 7, wherein:

the traffic prediction is executed by a traffic prediction model;

when the input data is input into the traffic prediction model, the traffic prediction model generates an output prediction indicating whether there is traffic during next transmission time or when there will be traffic; and when a traffic pattern is time-varying, after the traffic prediction, the traffic prediction algorithm is trained and updated.

* * * * *